United States Patent
Gorman et al.

[11] Patent Number: 5,951,022
[45] Date of Patent: Sep. 14, 1999

[54] FLUID SEAL DEVICE WITH REINFORCED DYNAMIC LIP

[75] Inventors: Gerald W. Gorman; Hal W. Gorman, both of Midlothian, Tex.

[73] Assignee: Gorman Company, Inc., Cedar Hill, Tex.

[21] Appl. No.: 08/944,241

[22] Filed: Oct. 6, 1997

[51] Int. Cl.⁶ .................................................. F16L 35/00
[52] U.S. Cl. .......................... 277/626; 277/624; 277/560; 277/349
[58] Field of Search ................................ 277/560, 562, 277/566, 567, 572, 626

[56] References Cited

U.S. PATENT DOCUMENTS

| | | | |
|---|---|---|---|
| 2,178,698 | 11/1939 | Penick et al. | 277/322 X |
| 2,230,725 | 2/1941 | Nathan | 277/335 |
| 2,252,240 | 8/1941 | Tschappat | 277/626 X |
| 2,815,973 | 12/1957 | Jackson | 277/572 |
| 2,953,398 | 9/1960 | Haugen et al. | 277/625 |
| 2,980,449 | 4/1961 | Dunton et al. | 277/615 |
| 3,020,054 | 2/1962 | Driancourt | 277/626 |
| 3,390,890 | 7/1968 | Kurtz | 277/626 X |
| 3,719,366 | 3/1973 | Pippert | 277/205 |
| 3,856,315 | 12/1974 | Stansbury | 277/625 |
| 4,818,209 | 4/1989 | Petersson et al. | 277/626 X |
| 4,834,398 | 5/1989 | Guzowski et al. | 277/627 X |
| 5,213,339 | 5/1993 | Walworth | 277/626 X |
| 5,509,670 | 4/1996 | Wheeler | 277/205 |

*Primary Examiner*—James R. Brittain
*Assistant Examiner*—Agatha Youmans
*Attorney, Agent, or Firm*—Jenkins & Wilson, P.A.

[57] ABSTRACT

An improved fluid seal device or pressure seal of the type suitable for uses such as sealing an annular space between an internal surface and a member having an outer cylindrical surface is described. The seal includes a reinforced body formed of fabric reinforced rubber and at least one dynamic lip made substantially of rubber. The lip protrudes from the seal so that a small portion of the lip contiguous to the body of the seal and containing fabric reinforcement is contacted by the movable member in addition to the movable member contacting the resilient portion of the lip. The resilient portion of the lip hinges along the interface between the resilient portion and the fabric reinforced portion to control break-away frictional forces between the seal and the member.

26 Claims, 6 Drawing Sheets

FLUID SEAL DEVICE WITH REINFORCED
DYNAMIC LIP

TECHNICAL FIELD

The present invention relates generally to pressure seal devices. More particularly, it relates to an improved pressure seal or packing member for sealing against differential pressure between an internal surface of a cylinder and an outer cylindrical surface of a member disposed therewithin wherein the seal provides favorable break-away friction characteristics as well as improved resistance to sudden failure.

BACKGROUND ART

The art of hydraulic elevators is undergoing a period of change. Conventional in-ground buried hydraulic cylinders used to motivate elevators in relatively low buildings (e.g., 2–6 floors) are being phased out in many areas due to environmental concerns over fluid leaking from the cylinders. Several replacement systems have been adopted. These systems include double post hoist-away hydraulic cylinders, telescopic cylinders, and roped (cable hydraulic) cylinders wherein pistons are placed beside the elevator car and unfortunately take up valuable hoist-away space. Previously, cylinders were placed below the elevator car and in-ground directly beneath the elevator car so as to minimize space requirements.

The use of these types of new cylinders has created new design parameters for the hydraulic seals used in the cylinders. Cross-sections of these seals need to be narrower to accommodate tighter clearances between the cab and piston. Indeed, dual piston hydraulic elevators place more surface area of the rubber seals in contact with the piston than single piston hydraulic elevators. The area of contact is approximately 1.4 times greater for dual pistons as compared to single pistons, weight and pounds per square inch being equal.

Cable hydraulic elevators operate at a 2-1 to 4-1 ratio, which means the piston must operate smoothly at one-half to one-quarter the speed of the car. Most real pistons in a hydraulic elevator will operate smoothly to below one foot per minute for short periods of time without vibration (one to two seconds) as piston speed decreases in cable hydraulic elevators. Seals must operate for longer periods of time below one foot per minute without causing vibration ("jumpiness" or "jerkiness") to the elevator cab and alarming passengers inside the cab.

Two (2), three (3), and four (4) stage synchronous hydraulic pistons operate under similar if not identical conditions described in the operation of cable hydraulic elevators.

By their nature, elevator hydraulics require very long hydraulic pistons. Almost all elevator hydraulics are made from pipe that are centerless ground. Tolerances on large sections of pipe fastened together, then ground and polished to a finished dimension, vary more than similar but smaller hydraulics. It would therefore be advantageous for the same seal to have the ability to seal over a wider range of tolerances with lower friction than previously possible with conventional seals.

For a standard seal cavity having a vertical cross-sectional width of 0.500 inches, most conventional lip seals operate with a cross-sectional interference of about 0.080 inches. From data gathered from controlled experiments, it has been observed that increasing interference increases the break-away force needed to overcome friction between the seal and the hydraulic piston. It has also been observed that decreasing interference lowers break-away, but also decreases seal life and sealing efficiency. These are the opposing design considerations of a hydraulic elevator seal.

Many in the art of hydraulic elevator seals have endeavored to overcome the problem of rapid failure or rupture of the seal. Seal devices which include un-reinforced sealing lips are more likely to fail due to splitting or tearing than fabric reinforced seals and the like. Such seal devices can include a reinforced base that fits within a seal cavity when the seal device is installed. But, the movable member in a hydraulic elevator system contacts such seal devices at the un-reinforced sealing lips only. Thus, such seal devices have low friction characteristics but are undesirable due to the splitting or tearing phenomenon. An example of such a seal is described in U.S. Pat. No. 5,509,670 issued to Wheeler on Apr. 23, 1996, and assigned to The Texacone Company.

Seals which include sealing lips made completely of a rigid re-enforcing fabric are known to resist sudden failure. That is, these seals fail in a gradual fashion, allowing time for inspection and replacement. However, such seals generally have higher break-away requirements and are thus prone to "jerkiness" and "jumpiness" when placed in operation, and such characteristics are undesirable.

What is needed, then, is a low friction, fluid seal device that resists rapid or sudden failure or rupture. Such a fluid seal device is lacking in the prior art.

DISCLOSURE OF THE INVENTION

In accordance with the present invention, applicants provide an improvement to fluid seal devices or pressure seals (also known as packing seals or packing members) of the type suitable for uses such as sealing an annular space between an internal surface of a cylinder and a member having an outer cylindrical surface. Other applications include mounting within a piston head to seal the piston head against the cylinder wall within which the piston head moves and the like.

The fluid seal device comprises an annular body having an inner side and an outer side, a closed end face, and an at least partly open end face defining a radial sealing area running along said inner side of said annular body and a radial sealing area running along said outer side; at least one of said radial sealing areas comprises a less rigid elastomeric material than a remaining portion of said annular body, said remaining portion of said annular body comprising a rigid reinforced material, said less rigid elastomeric material and said rigid reinforced material defining an interface between said at least one radial sealing area and said remaining portion of said annular body; and said at least one radial sealing area protruding from said annular body such that the member contacts said seal device both adjacent said interface at a contact point wherein said seal device comprises the rigid reinforced material and adjacent said interface at a contact area wherein said seal device comprises the less rigid elastomeric material of said at least one radial sealing area during movement of the member.

The at least partly open end face of said annular body can define a relatively shallow annular cavity around an entire circumference of said annular body and wherein said contact point of the member with the rigid reinforced material of the seal device lies along a horizontal line with a base of the cavity such that said interface lies between a distal tip of said at least one radial sealing area and said contact point. In the preferred embodiment, the seal device can further comprise a plurality of ribs that are symmetrically disposed about a central axis of said annular body within the shallow cavity such that said ribs define a plurality of smaller shallow cavities in said shallow cavity.

In the fluid seal device of this invention, said inner side and said outer side can taper downwardly and inwardly toward said closed end face, said inner or outer side which comprises said at least one radial sealing area tapering at a greater angle than said other side, whereby said seal device seats tightly when said seal device is contacted by the member.

Further, one of the inner side and the outer side can be shorter than the other side, said shorter side comprising a side opposite said at least one radial sealing area, and the inner side and the outer side taper inwardly as they progress towards the closed end face of said seal device, whereby said seal device seats tightly when said seal device is contacted by the member. In the preferred embodiment, the shorter side can be thinner than the other side.

Alternatively, the other radial sealing area also comprises a less rigid elastomeric material than said remaining portion of said annular body and wherein a second interface is defined between said less rigid elastomeric material of said other radial sealing area and said rigid reinforced material of the remaining portion of said annular body, said other radial sealing area protruding from said annular body such that the member contacts said seal device adjacent said interface at a contact point wherein said seal device comprises said rigid reinforced material and adjacent said interface at a contact area wherein said seal device comprises the less rigid elastomeric material of said other radial sealing area during movement of the member. In this embodiment, the radial sealing areas can comprise first and second lips, respectively.

The rigid reinforced material can comprise a fabric and an elastomeric material, said fabric defining superimposed convolutions within said elastomeric material. The less rigid elastomeric material can comprise a synthetic or natural polymeric material. The synthetic or natural polymeric material can comprise rubber.

Preferably, a vertical cross-sectional width of said seal device is proportional to a vertical cross-sectional width of the annular space.

Therefore, the seal of this invention is preferably reinforced with layers of rubber-coated fabric with at least one dynamic lip made out of solid rubber. To provide blow-out prevention, a small portion of the dynamic lip containing the reinforcing fabric must contact the movable member. The rest of the inner lip is preferably un-reinforced rubber to control break-away forces.

Accordingly, it is an object of this invention to provide a seal with larger interference for a given vertical cross-section.

It is a further object of this invention to provide a seal with appropriate break-away characteristics and with suitable reinforcements to prevent rapid or sudden failures or ruptures.

It is a further object of this invention to provide a balance of properties that will produce a long-lasting, smooth operating seal that resists sudden rupture; thus, it is not necessarily an object to provide the absolute lowest or best break-away characteristics.

It is still a further object of this invention to provide a seal with improved ability to seat within the annular space in which it is mounted.

Some of the objects of the invention having been stated hereinabove, other objects will become evident as the description proceeds, when taken in connection with the accompanying drawings as best described hereinbelow.

BEST MODE FOR CARRYING OUT THE INVENTION

For the purposes of the foregoing detailed description, the following definitions will be used:

The term "interference" is used to describe the amount an elastic seal must deform to be installed in a seal cavity.

The term "cross sectional interference" is used to describe the interference of the seal along a vertical cross section, or in other words, the vertical cross sectional width of the seal minus the vertical cross sectional width of the seal cavity in which the seal is installed.

The term "break-away" is used to describe the force needed to overcome friction between the seal and movable member, and more particularly the force to motivate the movable member from stop position to motion.

The terms "jumpiness" or "jerkiness" are meant to describe the sudden jerks or jumps experienced in an hydraulic elevator when the break-away forces are too great.

Figure 1:
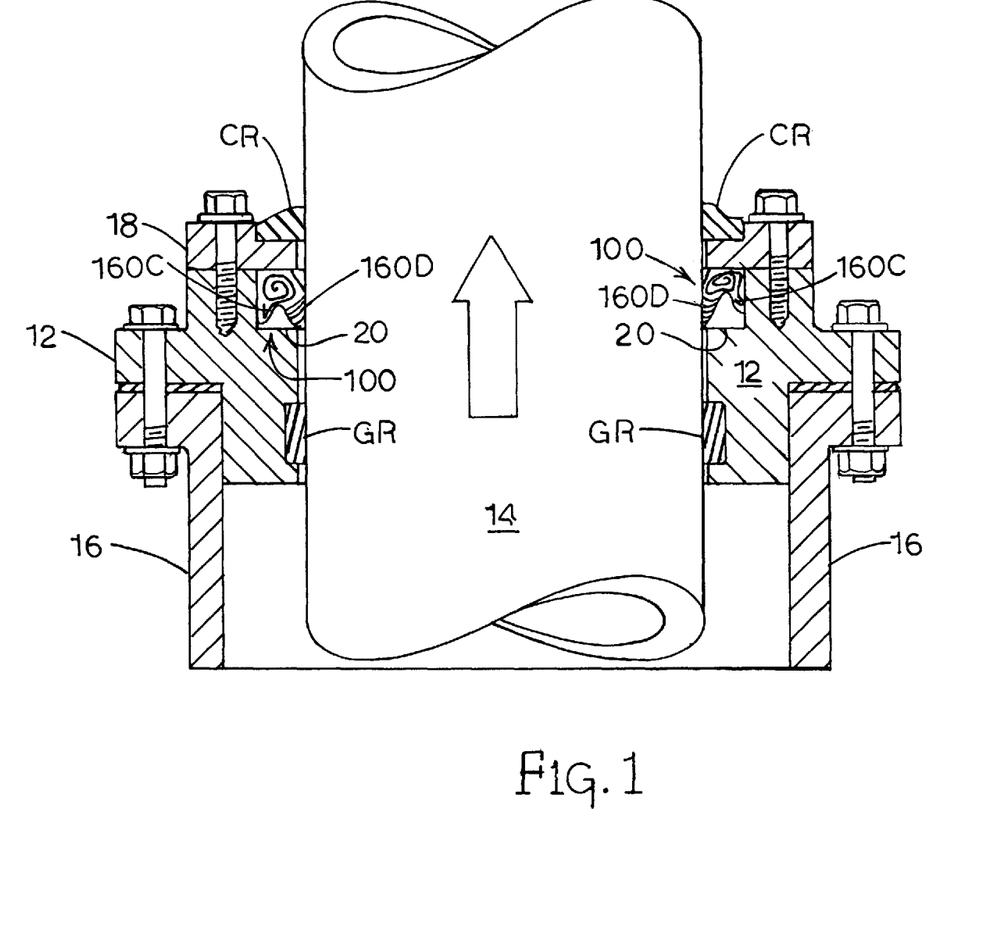
FIG. 1 is a schematic elevational view, partly in section, showing a fluid seal device in accordance with a preferred embodiment of the present invention in a typical installation and being subjected to hydraulic pressure.

Referring now to FIGS. 1–10 of the drawings, wherein like reference numbers refer to like or similar parts throughout, FIG. 1 shows a typical installation such as a hydraulic elevator wherein the inventive fluid seal 100 forms a seal between cylinder head 12 and ram or jack plunger 14 in the hydraulic elevator apparatus. In this type of installation, ram or jack plunger 14 normally supports the elevator car and movement of the plunger is controlled by pressure of hydraulic fluid within jack cylinder 16. Cylinder head 12 is affixed to the upper end of cylinder 16 in a conventional manner, and a cap ring 18 is affixed to the upper end of cylinder 12 in a conventional manner so as to cover conventional wiper ring CR. A guide ring GR is carried by cylinder head 12 in order to constrain lateral movement jack ram or jack plunger 14. As previously stated, applicants note that all of the structure just described other than applicants' novel seal 100 is conventional and well known in the art.

Also, an annular cavity 20 with a square or rectangular cross-section shape is provided in cylinder head 12 for receipt of fluid seal device 100 therein. As best seen with reference to FIG. 1 and as is well known in the art, during movement of ram or jack plunger 14 conventional seal devices (not shown) act to provide an increased surface area in contact with moving ram or jack plunger 14 and thereby to significantly increase the friction therebetween. This increased friction between displaced or deformed seal device and ram or jack plunger 14 during its movement tends to cause jerks or jumps in the movement of the jack plunger. This problem is well known and is inherent in all known prior art seals, including conventional U-cup and O-ring seals. Moreover, the high friction phenomenon is found not only in the use of seals for hydraulic cylinders in elevator cars, but also in farm machinery, construction equipment, automotive applications, etc.

Figure 4:
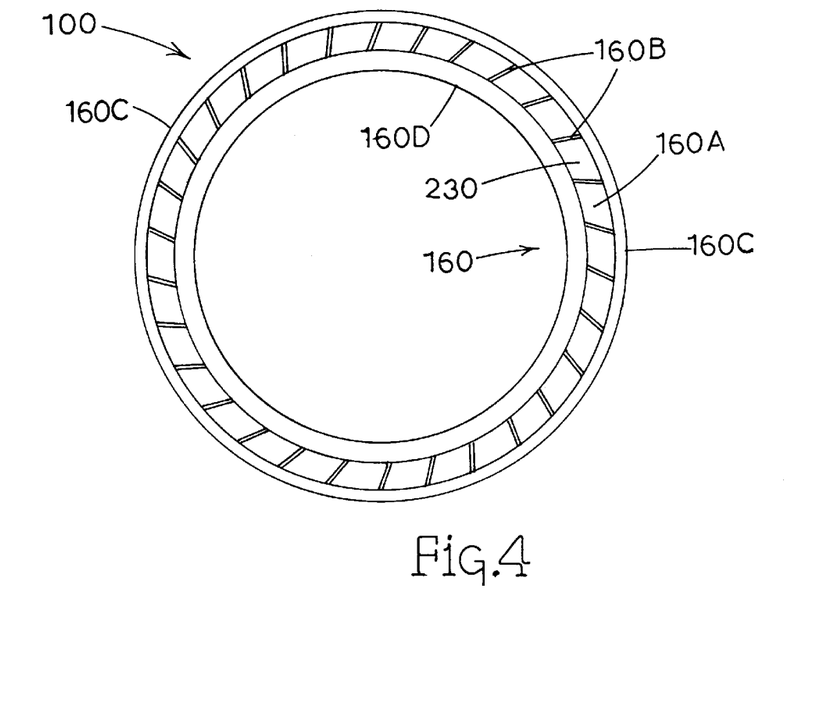
FIG. 4 is a top plan view of the fluid seal device shown in FIG. 3.
Figure 5:
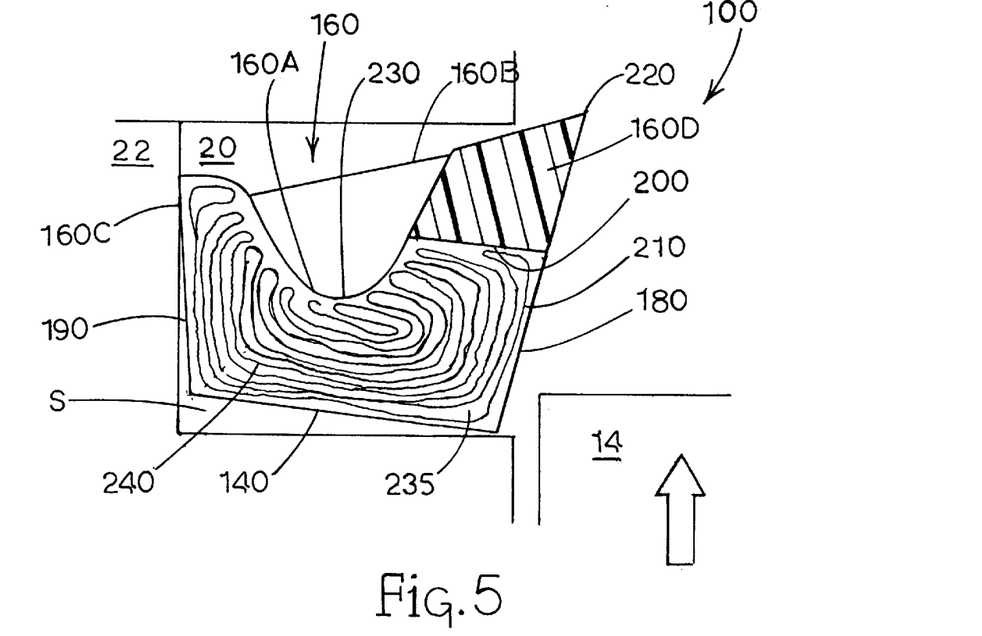
FIG. 5 is a vertical cross-sectional view of a fluid seal device in accordance with a preferred embodiment of the present invention in the installation shown in FIG. 1 wherein the cylinder ram is being installed.

Referring now more specifically to FIGS. 1–6 and 10 of the drawings, FIG. 1 depicts applicants' novel seal 100 in annular cavity 20 of the installation (ram and cylinder head). FIG. 5 shows this configuration just after installation of seal 100 and during installation of ram or jack member 14 into its operative mode. Packing ring or seal 100 is generally in the form of an annulus or ring having a body 120, a closed end face 140, an at least partly open end face 160, an inner side 180, and an outer side 190 (see FIGS. 3 and 4). The at least partly open end face 160 has a plurality of shallow cavities 160A therein. The cavities 160A are symmetrically disposed within the body 120 of seal 100. Also, a plurality of ribs 160B are provided between adjacent shallow cavities 160A. Cavities 160A extend only partly into open end 160 and do not extend into body 120 of seal 100 or to a depth near closed end face 140.

Partly open end face 160 has integrally formed outer radial sealing area 160C and inner radial sealing area 160D (see FIGS. 4 and 5). Outer radial sealing area 160C is formed on the outer side 190 of body 120 and inner radial sealing area 160D is formed on the inner side 180 of body 120 of seal 100. Outer radial sealing area 160C serves to assure a positive static seal, and inner radial sealing area 160D serves to provide dynamic positive sealing and low friction during contact with ram or jack cylinder 14. Likewise, in the piston head and cylinder installation shown in FIG. 2, inner radial sealing area 160D' serves to assure a positive static seal, and outer radial sealing area 160C' serves to provide dynamic positive sealing and low friction contact during contact with the cylinder wall 54.

Figure 6:
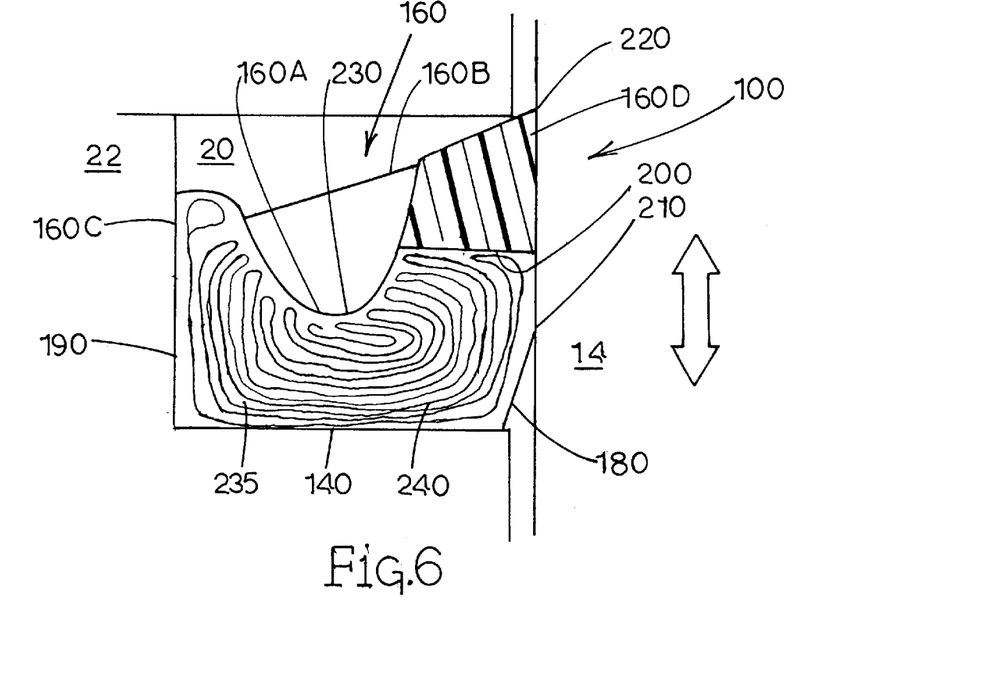
FIG. 6 is a vertical cross-sectional view of the fluid sealing device shown in FIG. 5 showing upward movement of the cylinder ram and wherein the inner radial sealing area has hinged upwardly while presenting a contact surface area to the cylinder ram.

As best seen in FIGS. 5 and 6, closed end face 140, outer radial sealing area 160C, inner side 180 and outer side 190 of seal 100 define a cross-section comprising a rigid reinforced material that is more rigid than the material comprising inner radial sealing area 160D of at least partly open end face 160. For example, the first portion of seal 100 may comprise a medium or rock-hard grade elastomeric material 235 such as natural or synthetic rubber having a fabric layer 240 wound and convoluted therein. Inner radial sealing area 160D preferably comprises a less rigid elastomeric material, such as solid natural or synthetic rubber. This area is represented by diagonal lines in FIGS. 1–6 and 10. The higher rigidity portion of seal 100 defines an interface 200 with the lower rigidity elastomeric portion of seal 100 formed by inner radial sealing area 160D. Interface 200 lies between the tip 220 of inner radial sealing area 160D and the base 230 of cavity 160A.

Inner radial sealing area 160D protrudes outwardly from seal 100 at a sufficient angle so as to place a seal contact region 210 into the path of oncoming ram or jack plunger 14, as best seen in FIGS. 5 and 6 of the drawings. Contact point 210 lies substantially along the same horizontal line as the base 230 of cavity 160A. Interface 200 therefore lies between contact point 210 and the tip 220 of inner radial sealing area 160D. Through this configuration, ram or jack plunger 14 contacts the rigid reinforced portion at contact point 210 while contacting the less rigid elastomeric region of inner radial sealing area 160D, thereby providing the increased seal life and reduced break-away characteristics of the present invention.

Continuing with FIGS. 1–6 and 10, the width of closed end face 140 is defined by downwardly and inwardly tapering inner side 180 and outer side 190. Therefore, as best seen in FIG. 5, a space S is present between closed end face 140 and the bottom surface of cavity 20 prior to ram or jack plunger 14 contacting seal 100. Thus, when ram or jack plunger 14 contacts seal 100, seal 100 "toggles" and seats effectively within cavity 20 with closed end face 140 in full contact with the bottom surface of cavity 20, as shown in FIG. 6. The "toggling" effect provided by the tapering of closed end face 140 provides improved seating within cavity 20, which is another aspect of the present invention. This effect is enhanced in that the wall area as defined by outer radial sealing area 160C and outer side 190 is thinner than the wall area as defined by inner sealing area 160D and inner side 180 so that when an internal pressure is applied seal 100 will be urged to fully contact the bottom static wall of cavity 20 (see FIG. 6).

In use, seal 100 is typically positioned in a hydraulic cylinder to contact hydraulic ram or jack plunger 14 (see FIGS. 1 and 5–6) when a hydraulic fluid such as an oil enters cavity 20 and contacts open face 160 of seal 100. However, a distinction between applicants' seal 100 and prior art seal devices in this type of situation is that dynamic inner radial sealing area 160D will tend to hinge at interface 200 due to its relatively greater flexibility during displacement by hydraulic oil entering cavity 20 to effect sealing during movement of ram or jack plunger 14. Additionally, ram or jack plunger 14 contacts contact point 210 while contacting dynamic inner sealing area 160D so that ram or jack plunger 14 also contacts seal 100 in a portion comprising the rigid reinforced material. Contact in this area increases the life of the seal while the hinging at interface 200 coupled with the taper and elastomeric composition of dynamic inner sealing area 160D provides for a degree of frictional resistance that obviates "jerkiness" and "jumpiness" as present in prior art seals.

Thus, the present invention provides a solution to the often counter-working problems of the need to provide a more durable seal while at the same time providing a seal with appropriate "break-away" characteristics. These characteristics are improved by the "toggling" and improved seating effect provided by the tapering of outer side 190 so that seal 100 is forced to seat tightly within cavity 20, when inner side 180 is contacted by ram or jack plunger 14 so as to close space S between closed end face 140 and the bottom surface of cavity 20.

Preferably, inner and outer sealing areas 160C and 160D protrude from seal 100 so as to define inner and outer sealing lips. As shown in FIGS. 1–6 and 10, the lips are tapered to allow greater interference without adding appreciably to break-away friction. Thus, certain dimensions of inner and outer lips as well as the angles defined by the lips are preferred to achieve a low friction seal.

Figure 7:
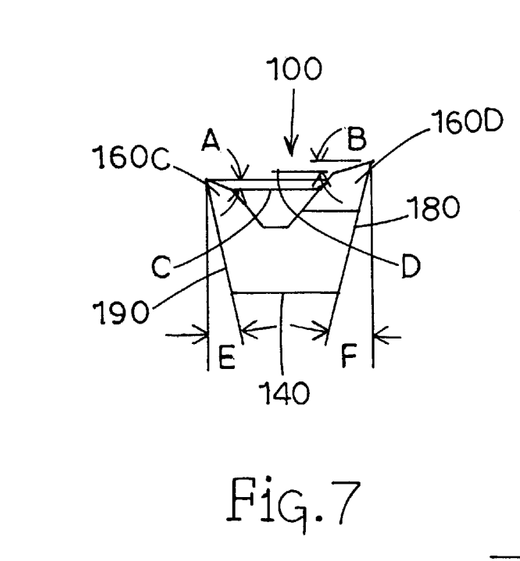
FIG. 7 is a cross-sectional view of a preferred embodiment of the present invention wherein preferred angles are referenced.
Figure 8:
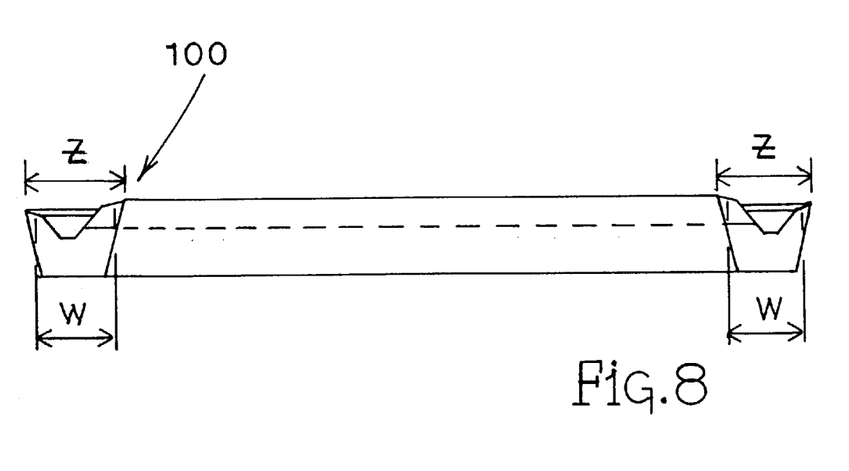
FIG. 8 is a vertical cross-sectional view of a fluid seal device in accordance with a preferred embodiment of the present invention wherein preferred dimensions are presented.
Figure 9:
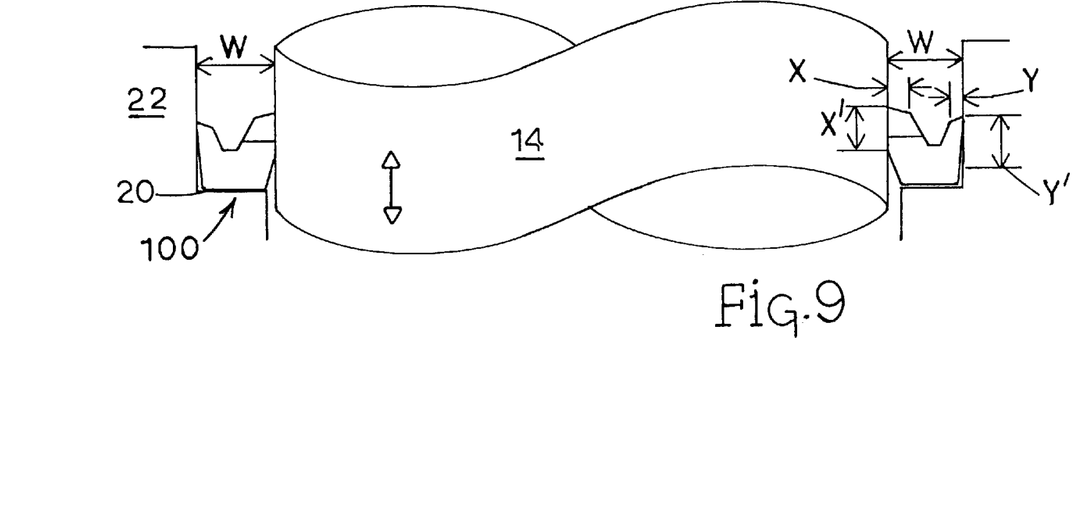
FIG. 9 is a vertical cross-sectional view of the fluid sealing device shown in FIG. 8 during movement of a cylinder ram wherein the cylinder ram is in contact with the fluid seal and wherein preferred dimensions of the fluid sealing device are also referenced.

Exemplary preferred angles and dimensions are presented in FIGS. 7–9. When an annular space defined by a vertical wall 22 of cavity 20 and by ram 14 has a vertical cross-sectional width W of 0.500 inches, open end face 160 preferably has a vertical cross-sectional width Z of 0.636 inches. Alternatively, cross-sectional width Z can range from about 0.620 to about 0.660 inches. Thus, seal 100 can provide a cross sectional interference ranging from about 0.120 to about 0.160 inches.

As best seen in FIG. 9, the distance X' is preferably 1.2 to 1.6 times the distance X, and the distance Y' is preferably 1.2 to 2 times the distance Y. Angles A and B (see FIG. 7) are preferably 20°; angle C is preferably 68°; angle D is preferably 50°; angle E is preferably 4°; and angle F is preferably 8°.

With the foregoing preferred dimensions, angles and proportions provided, applicants further contemplate that cross-sectional width Z of seal 100 is proportional to a cross-sectional width W of the annular space defined by a vertical wall 22 of cavity 20 and ram 14. Thus, from the widths presented above, that is, width W=0.500 inches, and width Z=0.636 inches, additional widths Z can be extrapolated.

For example, when width W=0.250 inches, that is, one half of width W presented above, width Z=0.318 inches, or half of width Z presented above. Likewise, when W=0.750 inches, that is 1½ times as wide as width W presented above, width Z=0.954 inches, or 1½ times width Z presented above. Therefore, when width W decreases, width Z decreased proportionately, and when width W increases, width Z increases proportionately.

Continuing with FIGS. 7–9, it is also contemplated that angle F is preferably greater than angle E. Stated differently, in the embodiment depicted in FIGS. 7–9, outer side 190 comprises radial sealing area 160C, which acts as the static sealing area during sealing. Inner side 180 comprises sealing area 160D, which acts as the dynamic sealing area during sealing. Inner side 180 and outer side 190 taper downwardly and inwardly toward closed end face 140. Inner side 180, which comprises dynamic sealing area 160D, tapers at a greater angle, angle F, than the angle, angle E, at which outer side 190, which comprises static sealing area 160C, tapers. This feature insures that seal 100 will seat tightly within cavity 20 according to an object of this invention, but will not twist, or "over-toggle", to provide ineffective seating and/or to provide excessive contact between ram 14 and the re-enforced area of seal 100. Such excessive contact may produce excessive friction and thus, unwanted break-away characteristics for seal 100.

It is therefore preferred that for all embodiments of the seal of this invention, the angle of taper for the side including the dynamic sealing area is greater than the angle of taper for the side including the static sealing area. This feature provides for appropriate clearance between a movable member like ram 14 and the reinforced portion of the dynamic sealing area.

Figure 2:
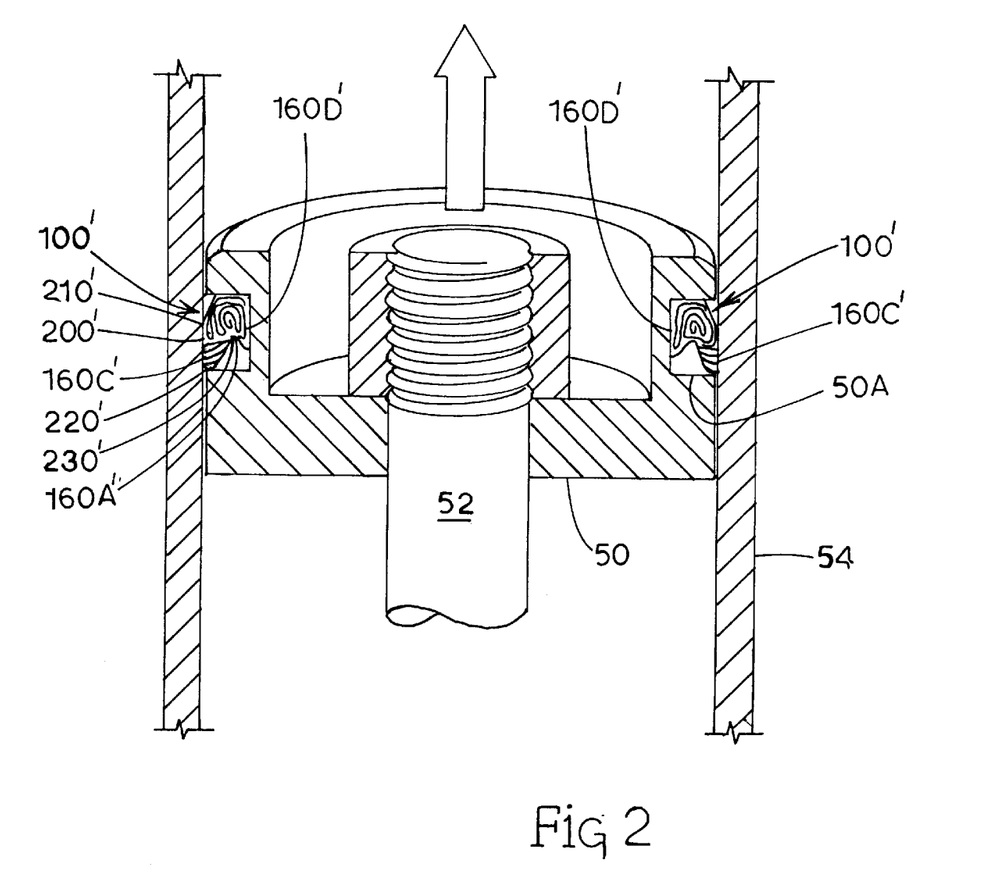
FIG. 2 is a schematic elevational view, partly in section, showing a fluid seal device in accordance with an alternative embodiment of the present invention in another typical installation and being subjected to hydraulic pressure.
Figures 3, 3A:
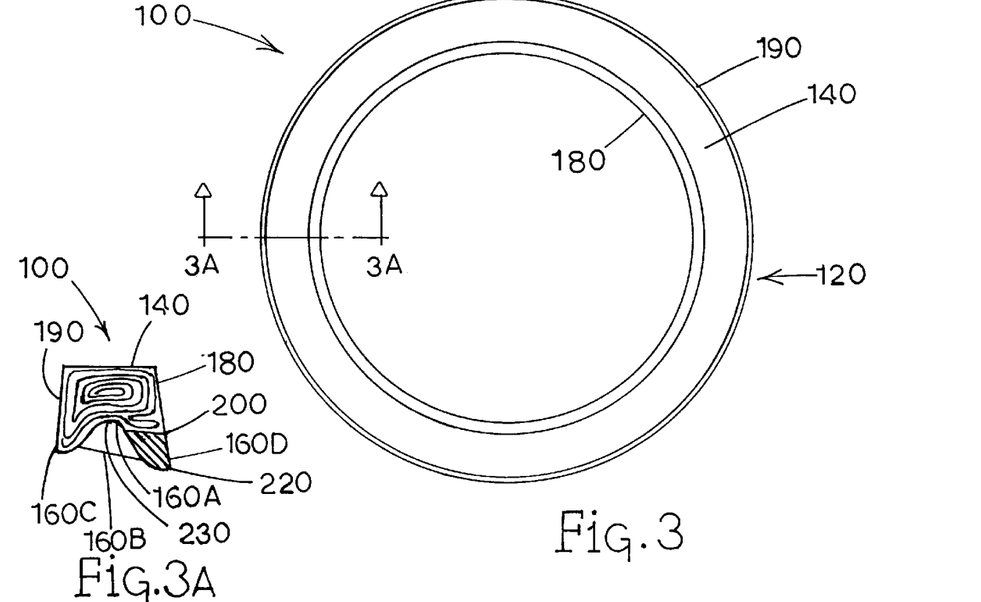
FIG. 3 is a bottom plan view of a seal device in accordance with a preferred embodiment of the present invention.
FIG. 3A is a cross-sectional view of the seal device of FIG. 3 taken along lines 3A—3A.

Referring now to FIG. 2, an alternative embodiment 100' of the seal of this invention is placed in a piston head and cylinder installation (wherein piston head drives piston rod 52 within cylinder 54). Seal 100' is placed into annular cavity 50A of piston 50. In this embodiment, outer radial sealing area 160C' serves to provide dynamic positive sealing and low friction during contact with cylinder 54 and inner radial sealing area 160D' serves to assure a positive static seal within annular cavity 50A of piston head 50. Stated differently, in the piston head and cylinder installation shown in FIG. 2, inner radial sealing area 160D' serves to provide a positive static seal, and outer radial sealing area 160C' serves to provide dynamic positive sealing and low friction contact during contact with cylinder wall 54.

In seal 100', the proportions and composition of inner and outer radial sealing areas 160C' and 160D' are reversed. Accordingly, outer radial sealing area 160C' comprises a less rigid elastomeric material and includes an interface 200' that lies between a tip 220' of outer radial sealing area 160C' and a contact point 210'. Contact point 210' lies within the rigid reinforced material and along a horizontal line with the base 230' of cavity 160A'. Outer radial sealing area 160C' acts to provide the aforementioned dynamic positive sealing by virtue of the phenomenon wherein sealing area 160C' tends to hinge at interface 200' to provide appropriate breakaway characteristics.

Figure 10:
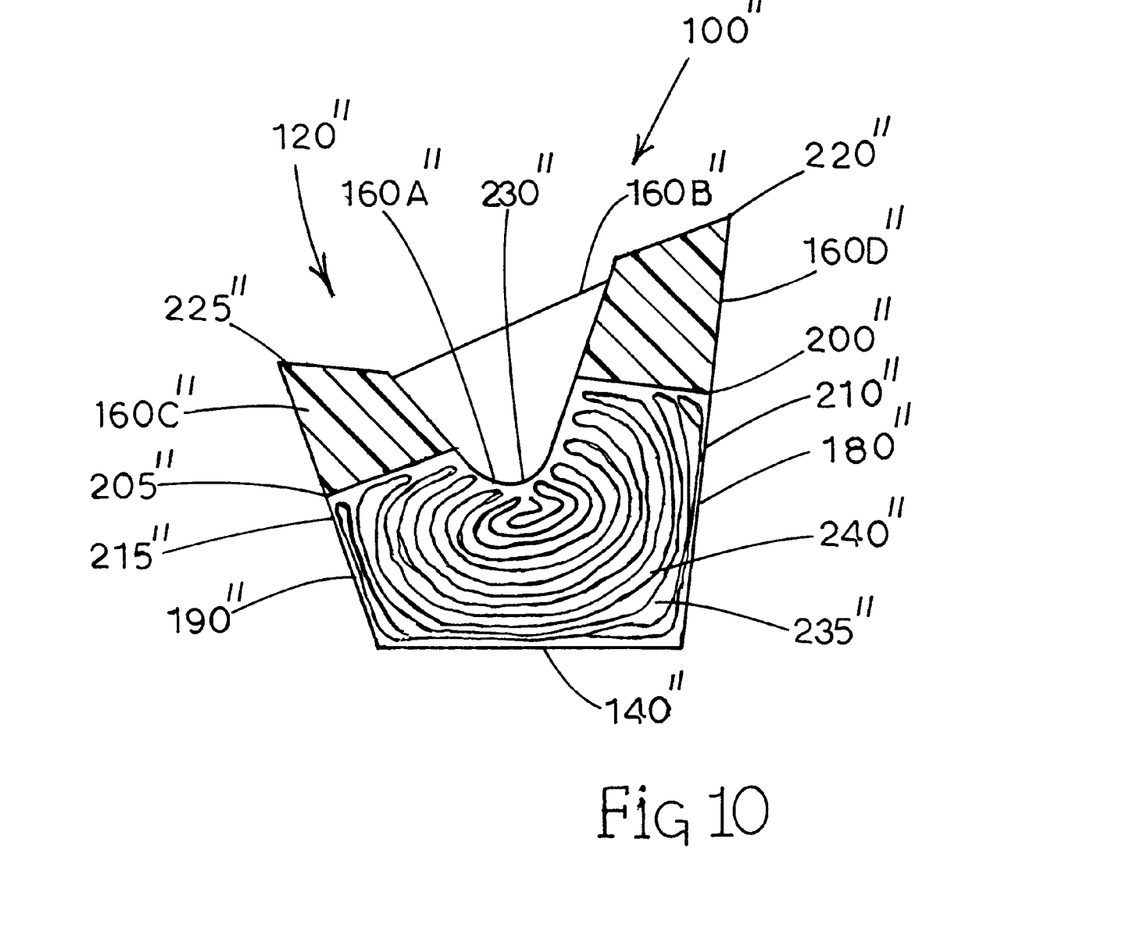
FIG. 10 is a vertical cross-sectional view of another alternative embodiment of the seal device of the invention.

Referring particularly now to FIG. 10, a third embodiment 100" of seal of this invention is depicted. In this embodiment of seal 100", inner and outer sealing areas 160D" and 160C" each comprise a less rigid elastomeric material designated by diagonal lines. Two interfaces 200", 205" are defined between the less rigid elastomeric material and the more rigid reinforced material of the closed end face 140". The rigid reinforced material comprises a medium or rock-hard grade composite material 235" having a fabric layer 240" wound and convoluted therein. Interfaces 200", 205" lie between the top tip 220", 225" of each sealing area 160D" and 160C" and dynamic and static contact points 210", 215". Dynamic and static contact points 210", 215" lie substantially along a horizontal line with base 230" of cavity 160A". This embodiment performs in operation in a similar manner as to the embodiments described above.

In summary, then, applicants contemplate that at least three embodiments of the seal of this invention are described. In cylinder installation depicted in FIGS. 1, and 5–9, inner radial sealing area 160D provides dynamic positive sealing with respect to ram or jack plunger 14, while outer radial sealing area 160C provides static sealing. In the piston installation depicted in FIG. 2, outer radial sealing area 160C' provides dynamic positive sealing with respect to cylinder 54, while inner radial sealing area 160D' provides static sealing. In FIG. 10, both outer radial sealing area 160C" and inner radial sealing area 160D" provide for improved static sealing in an installation where such sealing is desired as well as providing the improved dynamic sealing described above.

It will be understood that various details of the invention may be changed without departing from the scope of the invention. Furthermore, the foregoing description is for the purpose of illustration only, and not for the purpose of limitation—the invention being defined by the claims.

What is claimed is:

1. A fluid seal device suitable for use in sealing an annular space between an internal surface of a cylinder and a member therein having an outer cylindrical surface, the fluid seal device comprising:

(a) an annular body having an inner side and an outer side, a closed end face, and an at least partly open end face defining an inner radial sealing area running along said inner side of said annular body and an outer radial sealing area running along said outer side;

(b) said inner radial sealing area comprising a less rigid elastomeric material than a remaining portion of said annular body, said remaining portion of said annular body comprising a rigid reinforced material disposed substantially throughout said remaining portion, said less rigid elastomeric material and said rigid reinforced material defining an interface between said inner radial sealing area and said remaining portion of said annular body; and (c) said inner radial sealing area protruding from said annular body such that the member contacts said seal device both adjacent said interface at a contact area wherein said seal device comprises the rigid reinforced material and adjacent said interface at a contact area wherein said seal device comprises the less rigid elastomeric of said inner radial sealing area during movement of the member.

2. A fluid seal device according to claim 1, wherein said at least partly open end face of said annular body defines a relatively shallow annular cavity around an entire circumference of said annular body and wherein an initial contact point of the member with the rigid reinforced material of the seal device lies substantially along a parallel line with a base of the cavity such that said interface lies between a distal tip of said inner radial sealing area and said initial contact point.

3. A fluid seal device according to claim 2, further comprising a plurality of ribs that are symmetrically disposed about a central axis of said annular body within the shallow cavity such that said ribs define a plurality of smaller shallow cavities in said shallow cavity.

4. A fluid seal device according to claim 1, wherein said inner side and said outer side taper downwardly and inwardly toward said closed end face, said inner side tapering at a greater angle than said outer side, whereby said seal device seats tightly when said seal device is contacted by the member.

5. A fluid said device according to claim 1, wherein said outer side is shorter than said inner side, and said inner side and said outer side taper downwardly and inwardly toward said closed end face, whereby said seal device seats tightly when said seal device is contacted by the member.

6. A fluid seal device according to claim 5, wherein said inner side tapers at a greater angle than said outer side.

7. A fluid seal device according to claim 6, wherein said outer side is thinner than said inner side.

8. A fluid seal device according to claim 1, wherein said outer radial sealing area also comprises a less rigid elastomeric material than said remaining portion of said annular body and wherein a second interface is defined between said less rigid elastomeric material of said outer radial sealing area and said rigid reinforced material of the remaining portion of said annular body, said outer radial sealing area protruding from said annular body.

9. A fluid seal device according to claim 8, wherein said radial sealing areas comprise first and second lips, respectively.

10. A fluid seal device according to claim 1, wherein said rigid reinforced material comprises a fabric and an elastomeric material, said fabric defining superimposed convolutions within said elastomeric material.

11. A fluid seal device according to claim 1, wherein said less rigid elastomeric material comprises a synthetic or natural polymeric material.

12. A fluid seal device according to claim 11, wherein said synthetic or natural polymeric material comprises rubber.

13. A fluid seal device according to claim 1, wherein a cross-sectional width of said seal device is proportional to a cross-sectional width of said annular space.

14. A fluid seal device suitable for use in sealing an annular space between an internal surface of a cylinder and a member therein having an outer cylindrical surface, the fluid seal device comprising:

(a) an annular body having an inner side and an outer side, a closed end face, and an at least partly open end face defining an inner radial sealing area running along said inner side of said annular body and an outer radial sealing area running along said outer side;

(b) said outer radial sealing area comprising a less rigid elastomeric material than a remaining portion of said annular body, said remaining portion of said annular body comprising a rigid reinforced material disposed substantially throughout said remaining portion, said less rigid elastomeric material and said rigid reinforced material defining an interface between said outer radial sealing area and said remaining portion of said annular body; and (c) said outer radial sealing area protruding from said annular body such that the internal surface of the cylinder contacts said seal device both adjacent said interface at a contact area wherein said seal device comprises the rigid reinforced material and adjacent said interface at a contact area wherein said seal device comprises the less rigid elastomeric material of said outer radial sealing area during movement of the member.

15. A fluid seal device according to claim 14, further comprising a plurality of ribs that are symmetrically disposed about a central axis of said annular body within the shallow cavity such that said ribs define a plurality of smaller shallow cavities in said shallow cavity.

16. A fluid seal device according to claim 14, wherein said inner side and said outer side taper downwardly and inwardly toward said closed end face, said outer side tapering at a greater angle than said inner side, whereby said seal device seats tightly when said seal device is contacted by the internal surface of the cylinder.

17. A fluid seal device according to claim 14, wherein said inner side is shorter than said outer side, and said inner side and said outer side taper downwardly and inwardly toward said closed end face, whereby said seal device seats tightly when said seal device is contacted by the internal surface of the cylinder.

18. A fluid seal device according to claim 17, wherein said outer side tapers at a greater angle than said inner side.

19. A fluid seal device according to claim 18, wherein said inner side is thinner than said outer side.

20. A fluid seal device according to claim 14, wherein said inner radial sealing area also comprises a less rigid elastomeric material than said remaining portion of said annular body and wherein a second interface is defined between said less rigid elastomeric material of said inner radial sealing area and said rigid reinforced material of the remaining portion of said annular body, said inner radial sealing area protruding from said annular body.

21. A fluid seal device according to claim 20, wherein said radial sealing areas comprise first and second lips, respectively.

22. A fluid seal device according to claim 14, wherein said rigid reinforced material comprises a fabric and an elastomeric material, said fabric defining superimposed convolutions within said elastomeric material.

23. A fluid seal device according to claim 14, wherein said less rigid elastomeric material comprises a synthetic or natural polymeric material.

24. A fluid seal device according to claim 23, wherein said synthetic or natural polymeric material comprises rubber.

25. A fluid seal device according to claim 14, wherein a cross-sectional width of said seal device is proportional to a cross-sectional width of said annular space.

26. A fluid seal device according to claim 14, wherein said at least partly open end face of said annular body defines a relatively shallow cavity around an entire circumference of said annular body and wherein an initial contact point of the member with the seal device lies substantially along a parallel line with a side of the cavity such that said interface lies between a distal tip of said outer radial sealing area and said initial contact point.

* * * * *